United States Patent [19]

Zhao et al.

[11] Patent Number: 5,973,064
[45] Date of Patent: Oct. 26, 1999

[54] COLORED POLYESTER THERMOPLASTIC MATERIALS COMPRISED OF POLY(OXYALKYLENATED) COMPOUNDS AS COLORANTS AND SPECIFIC SURFACTANTS AS DILUENTS

[75] Inventors: X. Edward Zhao; Todd David Danielson, both of Moore; Eugene Kyle Stephenson; Elizabeth M. Irwin, both of Spartanburg, all of S.C.

[73] Assignee: Miliken Research Corporation

[21] Appl. No.: 09/111,218

[22] Filed: Jul. 7, 1998

[51] Int. Cl.[6] .................... C08L 67/00; D06P 5/13
[52] U.S. Cl. .................... 524/599; 264/143; 264/145; 264/148; 264/211.21; 264/331.11; 524/87; 524/88; 524/159; 524/539; 524/583; 524/83; 525/49; 525/935; 8/403
[58] Field of Search ........................... 264/143, 145, 264/148, 211.21, 331.11; 524/83, 87, 88, 159, 388, 583, 539, 599; 525/49, 935; 8/403

[56] References Cited

U.S. PATENT DOCUMENTS

| | | | |
|---|---|---|---|
| 3,674,736 | 7/1972 | Lerman et al. | 523/307 |
| 3,948,831 | 4/1976 | Cohn | 524/605 |
| 4,116,924 | 9/1978 | Peabody | 524/270 |
| 4,167,503 | 9/1979 | Cipriani | 524/297 |
| 4,167,510 | 9/1979 | Brendle | 524/729 |
| 4,284,729 | 8/1981 | Cross et al. | 521/158 |
| 4,332,587 | 6/1982 | Kressner et al. | 8/506 |
| 4,507,407 | 3/1985 | Kluger et al. | 521/113 |
| 4,555,534 | 11/1985 | Atkins | 523/507 |
| 4,600,736 | 7/1986 | Needham | 523/351 |
| 4,640,690 | 2/1987 | Baumgartner et al. | 8/506 |
| 4,720,514 | 1/1988 | Needham | 523/351 |
| 4,732,570 | 3/1988 | Baumgartner et al. | 8/506 |
| 4,751,254 | 6/1988 | Kluger et al. | 521/163 |
| 4,788,232 | 11/1988 | Needham | 523/351 |
| 4,812,141 | 3/1989 | Baumgartner et al. | 8/506 |
| 4,846,846 | 7/1989 | Rekers et al. | 8/515 |
| 4,871,371 | 10/1989 | Harris | 8/403 |
| 5,157,067 | 10/1992 | Burditt et al. | 524/270 |
| 5,240,980 | 8/1993 | Danielson et al. | 524/190 |
| 5,326,516 | 7/1994 | Brannon | 264/143 |
| 5,443,775 | 8/1995 | Brannon | 264/143 |
| 5,686,515 | 11/1997 | Phillips et al. | 524/275 |

FOREIGN PATENT DOCUMENTS 0 455 370   11/1991   European Pat. Off. .

*Primary Examiner*—Samuel A. Acquah
*Attorney, Agent, or Firm*—Terry T. Moyer; William S. Parks

[57] ABSTRACT

This invention relates to colored polyester thermoplastics comprised of polymeric colorants having poly(oxyalkylene) moieties and/or anionic dye/quatenary ammonium substantially inorganic salt-free colorant complexes mixed with diluents selected from the group consisting essentially of sorbitan ($C_8$–$C_{22}$) monoesters, ethoxylated sorbitan ($C_8$–$C_{22}$) monoesters, mixtures thereof of sorbitan ($C_8$–$C_{22}$) monoesters and ethoxylated sorbitan ($C_8$–$C_{22}$) monoesters, ethoxylated nonyl-phenol ethers, ethoxylated dodecylphenol ethers, mixtures thereof of said ethoxylated nonyl-phenol ethers and ethoxylated dodecylphenol ethers, and mixtures of (i) sorbitan ($C_8$–$C_{22}$) monoesters or ethoxylated sorbitan ($C_8$–$C_{22}$) monoesters and (ii) ethoxylated nonyl-phenol ethers or ethoxylated dodecylphenol ethers. Such diluents facilitate the introduction of the preferred polymeric colorants within feedstock polyester during the extrusion or injection molding process and provide a significant improvement over traditional polyester article colorants. The inventive colored polyester thermoplastic may be molded into any shape or form; however, plastics are commonly utilized as containers for liquids, such as soft drinks. A method of coloring polyester during an extrusion or injection molding procedure utilizing the inventive colorant/diluent formulations are also provided.

18 Claims, No Drawings

COLORED POLYESTER THERMOPLASTIC MATERIALS COMPRISED OF POLY(OXYALKYLENATED) COMPOUNDS AS COLORANTS AND SPECIFIC SURFACTANTS AS DILUENTS

FIELD OF THE INVENTION

This invention relates to colored polyester plastics comprised of polymeric colorants having poly(oxyalkylene) moieties mixed with a diluent selected from the group consisting essentially of sorbitan ($C_8$–$C_{22}$) monoesters, ethoxylated sorbitan ($C_8$–$C_{22}$) monoesters, and mixtures thereof, ethoxylated nonyl-phenol ethers, ethoxylated dodecylphenol ethers, and mixtures thereof. Such diluents facilitate the introduction of the preferred polymeric colorants within feedstock polyester during an extrusion or injection molding process and provide a significant improvement over traditional polyester article colorants. The inventive colored polyester plastic may be molded into any shape or form; however, plastics are commonly utilized as containers for liquids, such as soft drinks. A method of coloring polyester during an extrusion procedure utilizing the inventive colorant/diluent formulations are also provided.

BACKGROUND OF THE PRIOR ART

Poly(oxyalkylene) polymeric colorants have been utilized to permanently color myriad substrates, including thermoplastic resins, such as U.S. Pat. No. 4,284,729, to Cross et al., U.S. Pat. No. 4,507,407, to Kluger et al., and U.S. Pat. No. 4,751,254, to Kluger et al.; polyurethane foams, such as U.S. Pat. No. 4,846,846, to Rekers et al.; aqueous and non-aqueous liquids, such as U.S. Pat. No. 4,871,371, to Harris; and have been used as fugitive tints for textiles and threads, such as U.S. Pat. No. 4,167,510, to Brendle. Such colorants provide effective and stable colorations to such materials, are easily handled, and exhibit desirable migratory properties within certain substrates.

Colorants have been developed for utilization within polymer resins, including in polyester (polyethylene terephthalate, for instance), such as U.S. Pat. Nos. 4,332,587, to Kresser et al., 4,640,690, to Baumgartner et al., 4,732,570, to Baumgartner et al., 4,812,141, to Baumgartner et al., 5,157,067, to Burditt et al., 5,240,980, to Danielson et al., 5,326,516, to Branon, 5,443,775, to Brannon, and 5,686,515, to Phillips et al. The primary method of coloring such thermoplastics has been through the utilization of a color concentrate. Such a concentrate is basically comprised of colored polymer chips which, when introduced within a standard extrusion or injection molding process, melts with the subject resin pellets and subsequently colors the molten plastic upon mixing. Although this procedure is the primary manner of coloring thermoplastics, it also possesses certain disadvantages which have created problems in the past. For instance, the colorants themselves must be able to sustain dispersing during at least two distinct stages, namely the production of the concentrates polymer chips and then the coloring of the subject thermoplastic resin. Because of the need to form an initial concentrate, the colorant must also withstand high temperatures in the polymer chip formation and then, again, during the creation of the molten resin. Such high temperatures may degrade the colorant and subjecting such compounds to two distinct stages of melting increases the possibility of colorant loss.

A secondary procedure has also been utilized to color such thermoplastic articles. This procedure entails the introduction of a liquid colorant into an extrusion or injection molding machine simultaneously with subject resin pellets or chips, and the like. This method is preferable to the color concentrate because it is cost effective (there is no need to produce initial colored polymer chips), subjects the colorant to only one period of high temperature exposure, and allows for easy handling of the colorant in liquid form. Liquid poly(oxyalkylenated) colorants provide excellent colorations within polyester thermoplastic articles and withstand high temperatures processing reasonably well. It has proven difficult, however, to incorporate such beneficially performing liquid poly(oxyalkylene) colorants into polyester thermoplastic compositions by this secondary straight introduction method and also produce suitable aesthetically pleasing colorations within such substrates. The Baumgartner et al. references, for instance, each teach the utilization of such colorants within polyester thermoplastics; however, undesirable streaks and specks are noticeable within the final colored resin products. The problem appears to be that such colorants are not thoroughly and uniformly incorporated within polyester when utilized on typical commercial-scale molding equipment. Nowhere within the prior art is there a teaching or fair suggestion as to how such problems can be remedied for liquid poly(oxyalkylene) colorants. As a result, there still exists a need for providing the optimum coloring benefits of polyoxyalkylenated polymeric colorants within polyester thermoplastic compositions through the straight introduction of a liquid colorant during the extrusion or injection molding process.

OBJECTS OF THE INVENTION

Therefore, an object of the invention is to provide a polyoxyalkylenated colorant formulation which will effectively, thoroughly, and homogeneously color polyester thermoplastics. Another object of the invention is to provide a relatively inexpensive but greatly improved polymeric colorant formulation for the coloring of polyester thermoplastic materials during an extrusion or injection molding procedure. Additionally, it is an object of this invention to provide an poly(oxyalkylene) colorant/diluent surfactant formulation which performs at the optimum coloring level within such polyester thermoplastic media. Furthermore, it is a further object of the invention to provide a method for effectively, thoroughly, and homogeneously coloring polyester thermoplastic materials.

DETAILED DESCRIPTION OF THE INVENTION

Accordingly, the present invention encompasses a method for providing coloration to a polyester thermoplastic material during an extrusion or injection molding procedure comprising the steps of (a) providing an amount of feedstock polyester thermoplastic;

(b) providing a composition comprising a polyoxyalkylenated colorant defined by the Formula (I)

$$R\{A-[(\text{alkyleneoxy constituent})_n]_m\}_x \qquad (I)$$

wherein
R is an organic chromophore;
A is a linking moiety in said chromophore selected from the group consisting essentially of N, O, S, or $CO_2$;

Alkyleneoxy constituent contains from 2 to 4 carbon atoms;

n is an integer of from 2 to about 100;

m is 1 when A is O, S, or $CO_2$, and m is 2 when A is N;

x is an integer of from 1 to about 5;

from about 85 to about 15% by weight of the entire composition of a diluent selected from the group consisting of sorbitan ($C_8$–$C_{22}$) monoesters, ethoxylated sorbitan ($C_8$–$C_{22}$) monoesters, and mixtures thereof of said sorbitan ($C_8$–$C_{22}$) monoesters and ethoxylated sorbitan ($C_8$–$C_{22}$) monoesters, ethoxylated nonylphenol ethers, ethoxylated dodecylphenol ethers, mixtures thereof of ethoxylated nonylphenol ethers and ethoxylated dodecylphenol ethers, and mixtures of (i) sorbitan ($C_8$–$C_{22}$) monoesters or ethoxylated sorbitan ($C_8$–$C_{22}$) monoesters and (ii) ethoxylated nonyl-phenol ethers or ethoxylated dodecylphenol ethers; and optionally, a colorant substantially free from inorganic salts comprised of an anionic dye and a quatemary ammonium compound;

(c) mixing said feedstock polyester and said colorant composition in a standard plastic extrusion or injection molding machine thereby coloring said feedstock polyester with said colorant composition;

(d) melting said colored feedstock polyester within said standard extrusion or injection molding machine thereby producing a colored molten polyester;

(e) extruding or injection molding said colored molten polyester.

Also contemplated within this invention is a colored polyester thermoplastic material comprising a composition comprising a poly(oxyalkylenated) colorant defined by the Formula (I)

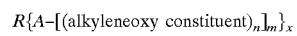

$$R\{A-[(\text{alkyleneoxy constituent})_n]_m\}_x \qquad (I)$$

wherein

R is an organic chromophore;

A is a linking moiety in said chromophore selected from the group consisting essentially of N, O, S, or $CO_2$;

Alkyleneoxy constituent contains from 2 to 4 carbon atoms;

n is an integer of from 2 to about 100;

m is 1 when A is O, S, or $CO_2$, and m is 2 when A is N;

x is an integer of from 1 to about 5; and a diluent selected from the group consisting essentially of sorbitan ($C_8$–$C_{22}$) monoesters, ethoxylated sorbitan ($C_8$–$C_{22}$) monoesters, mixtures thereof of sorbitan ($C_8$–$C_{22}$) monoesters and ethoxylated sorbitan ($C_8$–$C_{22}$) monoesters, ethoxylated nonyl-phenol ethers, ethoxylated dodecylphenol ethers, mixtures thereof of said ethoxylated nonylphenol ethers and ethoxylated dodecylphenol ethers, and mixtures of (i) sorbitan ($C_8$–$C_{22}$) monoesters or ethoxylated sorbitan ($C_8$–$C_{22}$) monoesters and (ii) ethoxylated nonyl-phenol ethers or ethoxylated dodecylphenol ethers; and optionally, a colorant substantially free from inorganic salts comprised of an anionic dye and a quaternary ammonium compound.

The poly(oxyalkylene) colorants are generally the same as those disclosed within the prior patents listed above. The organic chromophore (R) is, more specifically, one or more of the following types of compounds: azo, diazo, disazo, trisazo, diphenylmethane, triphenylmethane, xanthane, nitro, nitroso, acridine, methine, indamine, thiazole, oxazine, phthalocyanine, or anthraquinone. Preferably, R is one or more of nitro, triphenylmethane, methine, or thiazole based compounds. Group A is present on group R and is utilized to attach the polyoxyalkylene constituent to the organic chromophore. Nitrogen is the preferred linking moiety. The polyoxyalkylene group is generally a combination of ethylene oxide (EO) and propylene oxide (PO) monomers.

The preferred number of moles of polyoxyalkylene constituent per alcohol chain is from 2 to 15 (n would therefore preferably be from 4 to 30), more preferably from 4 to 10 (n would most preferably be from 8 to 20). Also, preferably two such alcohol chains are present on each polymeric colorant compound (x, above, is preferably 2). The colorants utilized within the present invention are generally liquid at ambient conditions of temperature and pressure. Examples of the particularly preferred colorants are presented in tabulated form below.

TABLE 1

Preferred Poly(oxyalkylenated) Colorants

| Ex. # | Chromophore | Moles EO | Moles PO | Group A |
|---|---|---|---|---|
| 1 | Methine | 7 | 15 | N |
| 2 | Phthalocyanine | 13 | 2 | N |
| 3 | Methine | 10 | 14 | N |
| 4 | Methine | 16 | 10 | N |
| 5 | Bisazo | 16 | 20 | N |

This list is, of course, merely intended to note the preferred colorants; any poly(oxyalkylenated) polymeric dye is encompassed within the scope of the invention.

Other colorants may also be present within this composition, most notably a substantially inorganic salt free complex comprised of an anionic dye and a quaternary ammonium compound. Such quaternary ammonium compounds include trialkyl quats, such as methyl tri (hydrogenated tallow) ammonium chloride; dialkyl quats, such as dicoco dimethyl ammonium chloride; dialkoxy alkyl quats, such as methyl bis(polyethoxyethanol) coco ammonium chloride; monoalkoxy quats, such as methyl (polypropylene glycol) diethyl ammonium chloride; and benzyl quats, such as dimethyl tallow benzyl ammonium chloride. Preferred are methyl bis[polyethoxy (15) ethanol] coco ammonium chloride (trade name Variquat® K1215, from Witco) and methyl (polypropylene glycol) diethyl ammonium chloride (trade name Emcol™ CC-9, from Witco). The table below shows the preferred anionic dyes which may be utilized also.

TABLE 2

Preferred Anionic Dye/Quaternary Ammonium Complex Colorants

| Ex. # | Dyes | Quaternary compounds | Physical Form |
|---|---|---|---|
| 6 | Acid red 52 | Variquat ® K1215 | Liquid |
| 7 | Acid yellow 17 | Variquat ® K1215 | Liquid |
| 8 | Quinoline yellow S | Variquat ® K1215 | Liquid |
| 9 | Quinoline yellow S | Emcol ™ CC-9 | Liquid |
| 10 | Acid yellow 23 | Variquat ® K1215 | Liquid |

TABLE 2-continued

Preferred Anionic Dye/Quaternary Ammonium Complex Colorants

| Ex. # | Dyes | Quaternary compounds | Physical Form |
|---|---|---|---|
| 11 | Direct violet 9 | Variquat ® K1215 | Liquid |
| 12 | Acid red 52 | Emcol ™ CC-9 | Liquid |
| 13 | Direct blue 86 | Variquat ® K1215 | Liquid |

Other such complexes are intended to be within the scope of this invention as this list is not intended to be exhaustive.

These complexes are produced first by determining the desired anionic dye to be utilized for its shade, lightfastness, thermal stability, and the like, for the subject substrate to be colored; second, select the appropriate quaternary ammonium compound for the subject substrate based on the necessarily required physical properties such as migration, uniform dispersion, solubility, washfastness, and the like; third, react the two compounds together to form a liquid complex; and last, remove the unwanted salts formed from the cation of the dye and the counter-ion of the quat. Various purification techniques may be performed in order to remove substantially all of the residual inorganic salts (such as chlorides and sulfates, as merely examples) from the complexes. Such techniques include, but are not limited to, solvent extraction, phase separation, ultrafiltration, and other filtration methods. Particularly preferred are ultrafiltration under high pressure, phase separation through the utilization of an ammonium carbonate rinsing procedure (i.e., three consecutive washings with 25% aqueous ammonium carbonate in a 1:1 weight ratio to complex), and solvent extraction filtration through the utilization of methylene chloride, chloroform, or the like. After the removal of excess inorganic salt, the resultant solution should also be stripped of excess water in order to purify the colorant complex. The inventive complexes will always form a liquid upon purification at a temperature below about 100° C. The particular methods of producing these types of colorants, through complexation and salt removal, are disclosed within U.S. patent application Ser. No. 09/065,597, by Zhao et al., herein incorporated by reference.

The term polyester thermoplastic material (or composition or resin) is intended to encompass any polyester, including co-polymers of different polyesters, thermoplastics comprised of a majority of polyester constituents, and a single polymer of polyester (i.e., polyethylene terephthalate, which is the preferred species). Feedstock is intended to encompass virgin or recycled polyester, whether in shredded, chipped, pelletized, or any like form. The term thermoplastic is well known in the art to mean a polymeric material which will melt upon exposure to sufficient heat but will retain its solidified state, but not prior shape without use of a mold, upon sufficient cooling. The inventive colored polyester thermoplastic is intended to be utilized ultimately as, for instance and not by limitation, containers for soft drinks, beer, liquor, water, and the like, as well as containers for any solid materials.

The specific surfactants required within this invention actually are utilized as diluents, in addition to their use for their surface-active properties, for the particular polymeric colorants. Such diluent surfactants have proven to provide the desired colorant affinity for the particular polyester resin pellets in an extrusion or injection molding process. Such a proper affinity allows for the production of the optimum colorations on the solid polyester pellets as well as within the polyester when present in its molten state. The compatibility of the poly(oxyethylenated) colorants with the particular polyester thermoplastics is thus increased upon the addition of the particular diluent surfactants of this invention in order to decrease the amount of color bubbles and streaks within the final thermoplastic product. Additionally, such diluent surfactants produce an unexpected benefit in reducing screw slippage during the extrusion procedure (within a screw extruder machine). Such a discovery of the particular diluent surfactants which provide these desired characteristics has thus required a great deal of testing in order to determine the specific compounds, mixtures, and proportions of diluents which produce the required effects, particularly in tandem with the preferred colorants utilized. The selection of such colorants thus depended not only on the colorability provided by such compounds, but also depended on the overall effects and characteristic produced in combination with the specific diluent surfactants which were found to act synergistically with the preferred colorants to generate the optimum color within polyester materials while also producing the lowest degree screw slippage.

Further criteria which the particular colorant/diluent surfactant combination must exhibit includes thermal stability while undergo high melting temperatures during the extrusion process; no degradation of the polyester either during processing or once the final product is made; cost effectiveness so as not to translate into higher prices for the consumer; transparency of the polyester is uniform throughout the entire finished product; low viscosity in order to permit better processing conditions; homogeneity of dissolution of the diluent surfactant within the polymeric colorant; and substantially no migration of the colorant from and within the finished polyester thermoplastic product. This non-migration characteristic is particularly unexpected within the inventive method and article because the utilization of a surfactant usually results in the removal of compounds from surfaces and substrates, not the opposite as was discovered here. The inventive method and article exhibits all of these necessary characteristics which thus shows the care and degree and analysis required in order to select the proper diluent surfactant for combination with the proper poly (oxyalkylene) colorant.

It was thus determined that the diluent surfactants which provide all of the beneficial characteristics mentioned above in tandem with the preferred polymeric colorants include sorbitan ($C_8$–$C_{22}$) monoesters, ethoxylated sorbitan ($C_8$–$C_{22}$) monoesters, mixtures of sorbitan ($C_8$–$C_{22}$) monoesters and ethoxylated sorbitan ($C_8$–$C_{22}$) esters, ethoxylated nonylphenol ethers, ethoxylated dodecylphenol ethers, mixtures of ethoxylated nonyl-phenol ethers and ethoxylated dodecylphenol ethers, and mixtures of sorbitan ($C_8$–$C_{22}$) monoesters or ethoxylated sorbitan ($C_8$–$C_{22}$) monoesters and ethoxylated nonylphenol ethers and ethoxylated dodecylphenol ethers. Ethoxylated nonylphenol ethers include ethoxylated dinonylphenol ethers as well. The sorbitan-based compounds not only provide the optimum results of colorations in polyester thermoplastic resins but they are also acceptable for use within materials compositions which may be utilized in association with compositions which are to be used for human consumption and/or ingestion.

The preferred diluent surfactants for utilization within the inventive method include, in tabulated form:

TABLE 3

Preferred Diluent Surfactants (with Tradenames)

| Ex. # | Surfactant | Available as and From |
|---|---|---|
| 14 | sorbitan monooleate | Span 80 ®; Imperial Chemical (ICI) |
| 15 | sorbitan monostearate | Span 60 ®; ICI |
| 16 | sorbitan monopalmitate | Span 40 ®; ICI |
| 17 | sorbitan monolaurate | Span 20 ®; ICI |
| 18 | polyoxyethylene (20) sorbitan monooleate | Tween 80 ®; ICI |
| 19 | polyoxyethylene (20) sorbitan monostearate | Tween 60 ®; ICI |
| 20 | polyoxyethylene (20) sorbitan monopalmitate | Tween 40 ®; ICI |
| 21 | polyoxyethylene (20) sorbitan monolaurate | Tween 20 ®; ICI |
| 22 | polyoxyethylene (7) dinonylphenol ether | Igepal ® DM 430; Rhône-Poulenc (RP) |
| 23 | polyoxyethylene (6) nonylphenol ether | Igepal ® CO 530; RP |
| 24 | polyoxyethylene (12) nonylphenol ether | Igepal ® CO 720; RP |
| 25 | polyoxyethylene (9) dinonylphenol ether | Igepal ® DM 530; RP |
| 26 | polyoxyethylene (9) nonylphenol ether | Igepal ® CO 630; RP |
| 27 | polyoxyethylene (4) nonylphenol ether | Igepal ® CO 430; RP |
| 28 | polyoxyethylene (1.5) nonylphenol ether | Igepal ® CO 210; RP |
| 29 | polyoxyethylene (4) nonylphenol ether | Igepal ® CO 430; RP |
| 30 | polyoxyethylene (9.5) nonylphenol ether | Syn Fac ® 905; Milliken & Company |
| 31 | polyoxyethylene (5.5) dodecylphenol ether | Igepal ® RC 520; RP 430 |
| 32 | polyoxyethylene (9.5) dodecylphenol ether | Igepal ® RC 620; RP |
| 33 | polyoxyethylene (11) dodecylphenol ether | Igepal ® RC 630; RP |

This list is not exhaustive as these are merely the preferred diluent surfactants within the inventive method and polyester thermoplastic article. Certain mixtures of ethoxylated and non-ethoxylated sorbitan esters may be utilized. Such specific combinations are listed below within the Preferred Embodiment. The same is true for the nonylphenol ethers and dodecylphenol ethers, as well as for the preferred colorants of this invention.

The colorant composition comprises about 15 to about 85% by weight of colorant and from about 15 to about 85% by weight of diluent surfactant. Preferably the amount of diluent surfactant is from about 25 to about 75% and most preferably from about 50 to about 57%. An amount of 5% of diluent surfactant has been utilized in the past with unsatisfactory results. Thus, the amount of diluent must be above such a low amount in the colorant/diluent formulation in order to provide the desired beneficial results. Optional additives may include plasticizers, such as PEG-400 and dibutyl phthalate, and the like, antistatic agents, stabilizers, ultraviolet absorbers, and other similar standard polyester thermoplastic additives.

Preferred Embodiment of the Invention

Examples of particularly preferred methods of coloring polyester thermoplastics and the preferred correlated colored articles within the scope of the present invention are exemplified below.

The colorant/diluent composition was introduced within an injection molding operation for a polyester thermoplastic, namely polyethylene terephthalate. A metering system was utilized whereby the colorant/diluent is added by way of a positive displacement or transfer pump, either continuously or, preferably, intermittently into the injection molding machine (such as an Arburg Molder). At the same time, the polyester resin was fed into the throat of the molding machine by way of a screw which works in concert with the transfer pump metering the liquid colorant/diluent. The rotating screw drew the resin pellets into the feed throat while the pump activated introduction of the liquid colorant/diluent into the same area of the machine (in this manner a consistent ratio of pellets to colorant were utilized in the coloring procedure). At that point, the mix of colorant/diluent and pellets was either fed into a mixing chamber within the molding machine or gravity fed directly into the feed section of the molder. Upon mixing or upon placement within the feed section, the pellets were subsequently melted. In the feed section, melting was accomplished through the utilization of a heated (heat transferred from the barrel of the machine) screw extruder which rotated. The rotating screw also effectuated thorough mixing of the colorant and the molten resin together producing a uniformly colored plastic melt which was then injected into a mold in order to form the desired thermoplastic article.

Testing for coloring improvements and other important criteria was accomplished through the formation of plaques of colored polyethylene terephthalate thermoplastic resin. These plaques were formed through the process outlined above with the specific compositions listed below in Table 4 for colorants and diluents.

TABLE 4

Colorant/Diluent Compositions Used to Form Polyester Thermoplastic Plaques

| Plaque | Colorant (Ex. # from Tables 1 and/or 2) in wt % | Diluent (Ex. # from Table 3) in wt % |
|---|---|---|
| A | 4 and 13 (25% each) | 14 and 22 (25% each) |
| B | 1 and 13 (21.5% each) | 14 (57%) |
| C | 2, 3 and 5 (16.67% each) | 20 (50%) |
| D | 2, 3 and 5 (8.33% each) | 20 (75%) |
| E | 2, 3 and 4 (8.33% each) | 14 (75%) |
| F | 2, 3 and 5 (16.67% each) | 14 and 20 (25% each) |
| G | 3, 5 and 13 (14.33% each) | 14 and 19 (28.5% each) |
| H | 2, 4 and 5 (16.67% each) | 20 (50%) |
| I | 2, 3 and 5 (16.67% each) | 20 (50%) |
| J | 2, 3 and 5 (16.67% each) | 14 and 21 (25% each) |
| K | 3, 5 and 13 (14.33% each) | 14 and 21 (28.5% each) |
| L | 3, 5 and 13 (14.33% each) | 14 and 20 (28.5% each) |
| M | 3, 5 and 13 (14.33% each) | 21 (57%) |
| N | 3, 5 and 13 (14.33% each) | 20 (57%) |
| O | 3, 5 and 13 (8.33% each) | 20 (75%) |
| P | 2, 3 and 5 (16.67% each) | 22 (50%) |
| Q | 2, 4, and 5 (16.67% each) | 23 (50%) |
| R | 2, 3 and 5 (25% each) | 22 (25%) |
| S | 4, 5 and 13 (16.67% each) | 30 (50%) |
| T | 1, 2 and 5 (16.67% each) | 22 (50%) |
| U | 1, 2 and 5 (16.67% each) | 25 (50%) |

TABLE 4-continued

Colorant/Diluent Compositions Used to Form Polyester Thermoplastic Plaques

| Plaque | Colorant (Ex. # from Tables 1 and/or 2) in wt % | Diluent (Ex. # from Table 3) in wt % |
|---|---|---|
| V | 4 and 13 (25% each) | 30 (50%) |
| W | 2, 3 and 4 (8.33% each) | 26 (75%) |
| X | 1, 5 and 13 (14.33% each) | 24 (57%) |
| Y | 1, 2 and 5 (14.33% each) | 22 (57%) |
| Z | 1, 2 and 5 (16.67% each) | 26 (50%) |
| AA | 1, 5 and 13 (14.33% each) | 31 (57%) |
| BB | 1, 2 and 5 (16.67% each) | 23 (50%) |
| CC | 1, 2 and 5 (16.67%.each) | 29 (50%) |
| DD | 1, 2 and 5 (16.67% each) | 28 (50%) |
| EE | 1, 5 and 13 (14.33% each) | 25 (57%) |
| FF | 1, 2 and 5 (16.67% each) | 23 (50%) |
| GG | 1, 5 and 13 (14.33% each) | 32 (57%) |
| HH | 1, 2 and 5 (16.67% each) | 33 (50%) |
| II | 1, 5 and 13 (14.33% each) | 31 (57%) |
| JJ | 1, 2 and 5 (16.67% each) | 32 (50%) |
| KK | 1, 2 and 5 (16.67% each) | 25 (50%) |
| LL | 1, 2 and 5 (16.67% each) | 26 (50%) |
| MM | 1, 5 and 13 (14.33% each) | 32 (57%) |
| NN | 1, 2 and 5 (16.67% each) | 28 (50%) |
| OO | 1, 5 and 13 (14.33% each) | 33 (57%) |

These plaque formulations are, of course, merely preferred embodiments of the inventive article and method and are not intended to limit the scope of this invention. The resultant plaques were then tested for Dispersion within each formed resin plaque. Such a test is empirical and objective in nature utilizing an eye view analysis of resultant colored resins with a sheet of white paper as the background. A ranking system was developed from 1 to 5 indicating the following:

1—no coloring possible
2—colorations clearly not uniform (heavy swirls of color throughout)
3—slight swirls apparent through very close analysis
4—very slight swirls viewed through hard analysis
5—no swirls at all Ten plaques produced through the same procedure and with the same colorant/diluent formulation are prepared and ranked individually. An average ranking was then taken from those ten which was the ranking given overall for the specific colorant/diluent formulation. An overall ranking of 3 or higher is considered acceptable for coloring polyester thermoplastic articles on a large scale. The following Table lists those for the plaques prepared in Table 4.

TABLE 5

Dispersion Rankings for Plaques in TABLE 4

| Plaque | Dispersion Ranking |
|---|---|
| A | 3.3 |
| B | 3.6 |
| C | 3.5 |
| D | 3.4 |
| E | 3.4 |
| F | 3.3 |
| G | 3.2 |
| H | 3.2 |
| I | 3.1 |
| J | 3.0 |
| K | 3.0 |
| L | 3.0 |
| M | 3.0 |

TABLE 5-continued

Dispersion Rankings for Plaques in TABLE 4

| Plaque | Dispersion Ranking |
|---|---|
| N | 3.0 |
| O | 3.0 |
| P | 3.4 |
| Q | 3.2 |
| R | 3.4 |
| S | 3.1 |
| T | 3.5 |
| U | 3.4 |
| V | 3.1 |
| W | 3.4 |
| X | 3.3 |
| Y | 3.3 |
| Z | 3.3 |
| AA | 3.2 |
| BB | 3.2 |
| CC | 3.2 |
| DD | 3.2 |
| EE | 3.1 |
| FF | 3.1 |
| GG | 3.0 |
| HH | 3.0 |
| II | 3.0 |
| JJ | 3.0 |
| KK | 3.0 |
| LL | 3.0 |
| MM | 3.0 |
| NN | 3.0 |
| OO | 3.0 |

The resultant plaques thus exhibited excellent colorations upon production of the molten polyethylene terephthalate resin in admixture with each of the specific colorant/diluent formulations.

Two other tests were undertaken to determine the particularly preferred colorant/diluent formulations of the invention. A 30 second Hobart Mixer test analyzed the mixing of 250 g of polyester resin pellets with a colorant/diluent formulation loading of 1000 for 30 seconds at a low speed in a Hobart mixer at room temperature (i.e., approximately 25° C.). Resultant samples showing clearly non-uniform large blots of random colorations were considered "poor"; non-uniform small blots of random colorations were considered "fair"; and uniform colorations throughout were considered "good" for this test. Plaques A and V, from Tables 4 and 5, exhibited the best results for this test. The final test was a Screw Slippage Out-put analysis within an extrusion machine. A control of 1.00 was set with no additives introduced into 1000 g samples of polyethylene terephthalate resin pellets (at a 10,000 loading being extruded on the killion at a 32:1 rate). The time to extrude 1000 g of resin was recorded. The out-put factor for each colorant/diluent composition was measured as the ratio of time required to extrude 1000 g of colored samples in relation to the pure control sample. An out-put factor at or near 1.00 (either above or below) indicated very little screw slippage and thus a highly favorable result. Again, the formulation utilized for Plaques A and V in Tables 4 and 5 exhibited the best out-put factors of 0.93 and 1.04, respectively.

For comparative purposes, and in order to show the difficulty in determining the proper diluents for introduction with the inventive polyester thermoplastic coloring methods and articles, a number of similar compositions of colorants and diluents were prepared and utilized within the same extrusion/coloring method outlined above. The Dispersion (D), Hobart Mixer (HM), and Screw Slippage (SS) tests were performed for each of these with the following results:

TABLE 6

Comparative Colorant/Diluent Formulations

| Colorant (from Table 1 and/or 2) in wt % | Diluent (wt %) | D | HM | SS |
|---|---|---|---|---|
| 2, 3 and 5 (16.67% each) | sorbitan trioleate (50%) | 1 | * | # |
| 3 and 13 (21.5% each) | glycerol tristearate (57%) | 2 | poor | 0.95 |
| 1 and 13 (21.5% each) | N,N-bis-hydroxyethyl cocoamide | 2.3 | fair | 0.90 |
| 1 and 2 (about 47.5% each) | Tween ® 80 (5%) | 2.5 | poor | 1.41 |

*no reading could be taken
no test was performed due to poor performance in the other tests The characteristics provided by the particular diluent surfactants of this invention are thus highly unexpected. The two most preferred colorant/diluent formulations provide the best overall results for Dispersion, Hobart Mixer, and Screw Slippage which was determined solely through a great deal of analysis of myriad different preparations. The synergism displayed by the component colorants and surfactants was quite surprising.

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. A method for providing coloration to a polyester thermoplastic material during an extrusion or injection molding procedure comprising the steps of (a) providing an amount of feedstock polyester thermoplastic;
   (b) providing a composition comprising
      a polyoxyalkylenated colorant defined by the Formula (I)

$$R\{A\text{-}[(\text{alkyleneoxy constituent})_n]_m\}_x \qquad (I)$$

wherein
      R is an organic chromophore;
      A is a linking moiety in said chromophore selected from the group consisting of N, O, S, and $CO_2$;
      Alkyleneoxy constituent contains from 2 to 4 carbon atoms;
      n is an integer of from 2 to about 100;
      m is 1 when A is O, S, or $CO_2$, and m is 2 when A is N;
      x is an integer of from 1 to about 5; and
      a diluent selected from the group consisting of sorbitan ($C_8$–$C_{22}$) monoesters, ethoxylated sorbitan ($C_8$–$C_{22}$) monoesters, mixtures thereof of sorbitan ($C_8$–$C_{22}$) monoesters and ethoxylated sorbitan ($C_8$–$C_{22}$) monoesters, ethoxylated nonyl-phenol ethers, ethoxylated dodecylphenol ethers, mixtures thereof of said ethoxylated nonylphenol ethers and ethoxylated dodecylphenol ethers, and any mixtures thereof of (i) sorbitan ($C_8$–$C_{22}$) monoesters or ethoxylated sorbitan ($C_8$–$C_{22}$) monoesters and (ii) ethoxylated nonyl-phenol ethers or ethoxylated dodecylphenol ethers; and
      optionally, a colorant substantially free from inorganic salts comprised of an anionic dye and a quaternary ammonium compound;

(c) mixing said feedstock polyester and said colorant composition in a standard plastic extrusion or injection molding machine thereby coloring said feedstock polyester with said colorant composition;
   (d) melting said colored feedstock polyester within said standard extrusion or injection molding machine thereby producing a colored molten polyester;
   (e) extruding or injection molding said colored molten polyester.

2. The method of claim 1 wherein
   said diluent is present in an amount of from about 25 to about 75% by weight of the total composition (b).
3. The method of claim 1 wherein
   said diluent is present in an amount of from about 50 to about 57% by weight of the total composition (b).
4. The method of claim 1 wherein
   said diluent is a mixture of a sorbitan ($C_8$–$C_{22}$) monoester and an ethoxylated nonyl-phenol ether.
5. The method of claim 4 wherein
   said diluent is a mixture of sorbitan monooleate and polyoxyethylene (7) dinonylphenol ether.
6. The method of claim 1 wherein
   said diluent is an ethoxylated nonyl-phenol ether.
7. The method of claim 6 wherein
   said diluent is polyoxyethylene (9.5) nonylphenol ether.
8. A thermoplastic material comprising
   a composition comprising
      a poly(oxyalkylenated) colorant defined by the Formula (I)

$$R\{A\text{-}[(\text{alkyleneoxy constituent})_n]_m\}_x \qquad (I)$$

wherein
   R is an organic chromophore;
   A is a linking moiety in said chromophore selected from the group consisting of N, O, S, and $CO_2$;
   Alkyleneoxy constituent contains from 2 to 4 carbon atoms;
   n is an integer of from 2 to about 100;
   m is 1 when A is O, S, or $CO_2$, and m is 2 when A is N;
   x is an integer of from 1 to about 5; and
   a diluent selected from the group consisting of sorbitan ($C_8$–$C_{22}$) monoesters, ethoxylated sorbitan ($C_8$–$C_{22}$) monoesters, mixtures thereof of sorbitan ($C_8$–$C_{22}$) monoesters and ethoxylated sorbitan ($C_8$–$C_{22}$) monoesters, ethoxylated nonyl-phenol ethers, ethoxylated dodecylphenol ethers, mixtures thereof of said ethoxylated nonylphenol ethers and ethoxylated dodecylphenol ethers, and any mixtures thereof of (i) sorbitan ($C_8$–$C_{22}$) monoesters or ethoxylated sorbitan ($C_8$–$C_{22}$) monoesters and (ii) ethoxylated nonyl-phenol ethers or ethoxylated dodecylphenol ethers.
9. The thermoplastic material of claim 8 wherein
   said diluent is a mixture of a sorbitan ($C_8$–$C_{22}$) mono ester and an ethoxylated nonyl-phenol ether.
10. The thermoplastic material of claim 9 wherein
    said diluent is a mixture of sorbitan monooleate and polyoxyethylene (7) dinonylphenol ether.
11. The thermoplastic material of claim 8 wherein
    said diluent is an ethoxylated nonyl-phenol ether.
12. The thermoplastic material of claim 11 wherein
    said diluent is polyoxyethylene (9.5) nonylphenol ether.
13. A colored polyester thermoplastic material comprising
    a colorant complex substantially free from unwanted chloride and sulfate salts comprising an anionic dye and
a quaternary ammonium compound;
and
a diluent selected from the group consisting of sorbitan ($C_8$–$C_{22}$) monoesters, ethoxylated sorbitan ($C_8$–$C_{22}$) monoesters, mixtures thereof of sorbitan ($C_8$–$C_{22}$) monoesters and ethoxylated sorbitan ($C_8$–$C_{22}$) monoesters, ethoxylated nonyl-phenol ethers, ethoxylated dodecylphenol ethers, mixtures thereof of said ethoxylated nonylphenol ethers and ethoxylated dodecylphenol ethers, and any mixtures thereof of
(i) sorbitan ($C_8$–$C_{22}$) monoesters or ethoxylated sorbitan ($C_8$–$C_{22}$) monoesters and
(ii) ethoxylated nonyl-phenol ethers or ethoxylated dodecylphenol ethers.

14. The thermoplastic material of claim 13 wherein
said diluent is a mixture of a sorbitan ($C_8$–$C_{22}$) monoester and an ethoxylated nonyl-phenol ether.
15. The thermoplastic material of claim 14 wherein
said diluent is a mixture of sorbitan monooleate and polyoxyethylene (7) dinonylphenol ether.
16. The thermoplastic material of claim 13 wherein
said diluent is an ethoxylated nonyl-phenol ether.
17. The thermoplastic material of claim 16 wherein
said diluent is polyoxyethylene (9.5) nonylphenol ether.
18. The method of claim 1 wherein
said diluent is present in an amount of from about 15 to about 85% by weight of the total composition (b).

* * * * *